US012601375B2

(12) United States Patent
Boyko et al.

(10) Patent No.: US 12,601,375 B2
(45) Date of Patent: Apr. 14, 2026

(54) BEARING ASSEMBLY WITH INTERNAL PRIME-RETAINING PRESSURIZED LUBRICATION SYSTEM

(71) Applicant: Flowserve Pte. Ltd., Singapore (SG)

(72) Inventors: William J. Boyko, Bath, PA (US); Timothy James Nish, Easton, PA (US); Neil Havrilla, Coplay, PA (US)

(73) Assignee: Flowserve Pte. Ltd., Singapore (SG)

( * ) Notice: Subject to any disclaimer, the term of this patent is extended or adjusted under 35 U.S.C. 154(b) by 161 days.

(21) Appl. No.: 18/591,968

(22) Filed: Feb. 29, 2024

(65) Prior Publication Data

US 2025/0277511 A1 Sep. 4, 2025

(51) Int. Cl.
  F16C 33/66 (2006.01)
  F01M 5/00 (2006.01)
(52) U.S. Cl.
  CPC ........ F16C 33/6659 (2013.01); F16C 33/664 (2013.01); F01M 2005/008 (2013.01)
(58) Field of Classification Search
  CPC ............... F16C 33/664; F16C 33/6659; F01M 2005/008; F01M 5/025
  See application file for complete search history.

(56) References Cited

U.S. PATENT DOCUMENTS

| | | | | |
|---|---|---|---|---|
| 2,604,188 A | * | 7/1952 | Marchant | ............ F16C 33/6659 |
| | | | | 415/90 |
| 3,767,013 A | * | 10/1973 | Caldwell | ............ F16C 33/6659 |
| | | | | 384/603 |
| 4,514,123 A | * | 4/1985 | Johnstone | ........... F16C 33/6659 |
| | | | | 408/11 |
| 4,597,679 A | | 7/1986 | Wlodkowski | |
| 4,915,510 A | | 4/1990 | Arvidsson | |
| 5,601,155 A | | 2/1997 | Gardner | |
| 5,724,934 A | * | 3/1998 | Faraci | ....................... F01P 3/02 |
| | | | | 384/465 |

(Continued)

FOREIGN PATENT DOCUMENTS

JP          2006177459 A      7/2006

OTHER PUBLICATIONS

International Search Report and Written Opinion for Application No. PCT/US2025/015564 mail date May 29, 2025, 12 pages.
"CH & C Kingsbury Bearing Systems" Kingsbury, Inc., 19 pages.

*Primary Examiner* — Minh Truong
(74) *Attorney, Agent, or Firm* — Maine Cernota & Curran

(57) ABSTRACT

An internal pressurized lubrication system of a radial support bearing assembly includes oil passages within a bearing housing that comprise a charge-retaining section bounded by vertical or upward-sloping passages and configured to retain an oil charge therein during a shutdown. A vent bleeds air into the suction side of the passages during a shutdown, thereby preventing syphoning of the oil charge from the charge-retaining section. In embodiments, a rear cover plug is doubly sealed to the bearing housing body, and air is substantially unable to enter the oil passages via the bearing or via the vent during a shutdown, such that the passages remain oil-filled and the pump prime is retained for an extended time period. The bearing assembly can further include a thrust bearing, and/or an axial displacement measurement probe parallel with the shaft-driven oil pump. The radial support bearing can be a journal bearing.

11 Claims, 7 Drawing Sheets

(56)                    References Cited

U.S. PATENT DOCUMENTS

| | | | | |
|---|---|---|---|---|
| 5,735,676 | A * | 4/1998 | Loos ........................ | F01D 25/18 |
| | | | | 184/6.16 |
| 5,779,005 | A * | 7/1998 | Jones, Jr ............. | F16C 33/6674 |
| | | | | 384/473 |
| 9,909,623 | B2 * | 3/2018 | Rodrigues ........... | F16C 33/6662 |
| 2012/0024097 | A1 * | 2/2012 | Strau ................... | F16H 57/0447 |
| | | | | 74/606 R |
| 2015/0123502 | A1 * | 5/2015 | Kim ........................ | H02K 9/19 |
| | | | | 310/54 |
| 2020/0256209 | A1 * | 8/2020 | Bauduin ............. | F16C 33/6659 |
| 2021/0301875 | A1 * | 9/2021 | Lefebvre ................ | F16C 19/54 |

* cited by examiner

BEARING ASSEMBLY WITH INTERNAL PRIME-RETAINING PRESSURIZED LUBRICATION SYSTEM

FIELD OF THE INVENTION

The invention relates to bearing systems applicable to rotating shaft apparatus, and more particularly to bearing systems that comprise internal pressurized lubrication.

BACKGROUND OF THE INVENTION

Rotating shaft apparatus, including centrifugal pumps, motors, and turbines, rely on bearing systems to support a rotating shaft. In many cases, bearing systems require bearing lubrication provided by a liquid lubricant. Often, an oil is used as the lubricating liquid. However, it will be understood that the term "oil" is used herein generically to refer to any liquid lubricant, unless otherwise stated or required by context.

Various oil lubrication methods can be implemented in bearing systems, such as splash lubrication, oil mist lubrication, oil ring lubrication, and pressurized lubrication. Heat can be efficiently removed from bearings by a circulating a lubrication oil within the bearing housing and cooling the lubrication oil in an oil cooler, which can be provided in the bearing housing. The heat can then be transferred to the bearing housing inner walls, which in turn conducts it to the exterior walls, ultimately allowing heat convection to the ambient air. Conversely, insufficient oil delivery to the bearings can result in insufficient oil film thickness and inadequate heat removal, which can increase the risk of direct contact between the bearing components, and ultimately to bearing failure, causing babbitt in journal bearings to deteriorate, and degrading the oil itself.

For large shaft sizes and/or rotational speeds, cost-effective oil lubrication methods, such as splash lubrication and oil ring lubrication, are often insufficient to deliver the required quantity of oil to lubricate bearings effectively, especially at large shaft diameters and rotational speeds. Instead, pressurized, "forced-fed" lubrication must be applied to the bearings in a sufficient quantity, and with adequate cooling. Typically, a shaft-driven lubrication pump fixed to the exterior of the bearing housing provides the required lubrication during normal operation, while a separate external oil pump is provided for startups, shutdowns, and loss of oil pressure situations. While reliable, this approach is complex, costly, and has a very large footprint. In addition, this approach often requires an external control system, which can delay pump startup after the required oil pressure is achieved. This can be disadvantageous if immediate startup is desired.

Another approach is to implement an internal oil pumping system within the bearing housing that includes an oil pump driven by the rotating shaft. It is critical for such internal lubrication systems to reliably deliver an adequate flow of oil to the bearings during normal operation, as well as during startups and shutdowns (transients). In particular, the oil that is provided in such systems tends to drain into an underlying "sump" when the shaft is not rotating, causing the pump to lose its "prime," such that, during startup, the oil pump will pump air instead of oil. As a result, lubrication of the bearings is delayed during startup, which can increase bearing wear, and ultimately lead to bearing failure.

One approach is to partially submerge a lubricating rotor (rotating disk, impeller, etc) in the oil sump, so that it will immediately begin to pump oil once the shaft begins to rotate. However, this approach does not eliminate the initial lubrication delay that results from the draining of the oil from the oil passages that connect the lubricating rotor to the bearings. These passages must be refilled with oil before lubrication of the bearings can begin. Also, submerging even a portion of the lubricating rotor in the oil sump tends to heat the oil in the sump when the pump is operating, thereby increasing the required oil cooling capacity of the system.

What is needed, therefore, is a bearing assembly comprising an internal, shaft-driven, pressurized lubrication system that minimizes or eliminates lubrication delays during system startup, without requiring direct contact between the lubricating rotor and the oil sump.

SUMMARY OF THE INVENTION

The present invention is a bearing assembly that is configured to support the shaft of a rotating shaft apparatus. The bearing assembly comprises at least one bearing that is lubricated by an internal, pressurized lubrication system comprising a lubricating liquid or "oil" that is pumped to the bearings from an "oil sump" by a lubricating rotor that is directly or indirectly driven by the shaft. The disclosed lubrication system minimizes or eliminates lubrication delays during system startup, without requiring direct contact between the lubricating rotor and the lubricating liquid in the oil sump. In embodiments, the lubricating liquid is an oil. However, it will be understood that the terms "oil" and "oil sump" are used herein generically to refer to any liquid lubricant and associated sump, unless otherwise stated or required by context.

The housing of the disclosed bearing assembly comprises a system of oil passages that maintains a quantity of oil, referred to herein as the "oil charge," close to the bearings when the shaft is not rotating, even if there is a loss of prime on the suction side of the lubricating rotor, for example if rotation of the shaft remains halted during an extended period of time. When rotation of the shaft is restarted, this retained oil charge is immediately delivered to the bearings, even while the lubricating rotor is initially pumping an "air pocket" toward the bearings as it draws oil into the suction side and refills the remainder of the oil passages with oil.

The retained oil charge is adequate to provide initial lubrication of the bearings during startup, in embodiments during the first 10 to 15 shaft rotations, which is sufficient to sustain lubrication of the bearings as the air pocket reaches the bearings and passes through, for example during one to five shaft rotations, until the normal delivery of oil from the sump to the bearings has resumed. Accordingly, lubrication startup delay is virtually eliminated by the present invention.

The oil charge is contained within a charge-retaining section of the oil passages within the bearing housing. When the lubrication system is not operating, the retained oil charge is inhibited from draining into the sump because the charge-retaining section is bounded on both sides by segments of the oil passages that are either vertical, or slanted obliquely upward (from the perspective of the charge-retaining section). In addition, a vent is provided between the lubricating rotor and the charge-retaining section that is configure to allow air to enter the suction side during a system shutdown. The oil passages are tightly sealed, such that air is only able to enter the oil passages during a system shutdown via the vent, and possibly also via the bearings. In embodiments, the vent is configured such that the rate at which air can enter the suction side of the oil passages during a shutdown via the vent is slightly faster than the rate at which air is able to enter the oil passages via the bearings, thereby preventing the retained oil charge from being syphoned away as the remainder of the oil in the oil passages drains into the sump. In embodiments, the vent also functions as a flow restrictor configured to control a flow of the oil from the lubricating rotor to the bearings.

If air is substantially unable to enter the oil passages through the bearings during a shutdown, for example if the bearings are journal bearings, then the vent can be configured to allow only a very slow entry of air, such that little if any oil drains from the oil passages into the sump, and the pumping system retains its prime, unless the shutdown continues for an extended period of time.

In embodiments, the disclosed bearing assembly includes a thrust bearing in addition to one or more radial support bearings. Some embodiments include an axial displacement measurement probe located in parallel with the shaft-driven lubricating rotor. And in various embodiments the disclosed bearing housing is a first of a plurality of interconnected bearing housings, wherein the lubricating rotor of the first bearing housing is configured to circulate pressurized oil to all of the bearing housings. In some of these embodiments the oil passages of each of the bearing housings include charge-retaining sections, each of which is configured to retain an oil charge during a shutdown.

The present invention is a bearing assembly that includes a bearing housing, a support bearing installed in the bearing housing and configured to radially support a horizontal, rotatable shaft, and a lubrication system. The lubrication system includes a sump formed in a lower section of the bearing housing, the sump being configured to contain a lubricating liquid, a plurality of lubricating liquid passages formed in the bearing housing, and a lubricating rotor installed in the bearing housing above the sump and configured to be rotated by the shaft.

The lubricating rotor, in combination with the lubricating liquid passages, is configured to draw the lubricating liquid from the sump, pressurize the lubricating liquid, and direct the pressurized lubricating liquid to the support bearing. The lubricating liquid passages comprise a suction passage configured to direct the lubricating liquid at ambient pressure from the sump to the lubricating rotor, a vertically downward or downward-sloping passage configured to receive the pressurized lubricating liquid from the lubricating rotor, and a charge-retaining section extending substantially horizontally from the vertically downward or downward-sloping passage to a lubrication delivery passage proximate the support bearing, the lubrication delivery passage providing liquid access from the charge-retaining section to the support bearing via a vertically upward or upwardly sloping segment, the charge-retaining section being thereby configured to retain a charge of the lubricating liquid when the lubricating rotor is not rotating.

Embodiments further include a vent configured to control a flow of air into the suction passage when the lubricating rotor is not rotating, thereby preventing the charge of the lubricating liquid from being syphoned out of the charge-retaining section as the lubricating liquid is gravitationally drawn from the suction passage to the sump. In some of these embodiments, the vent also functions as a flow restrictor that is configured to control a flow of the pressurized lubricating liquid through the vertically downward or downward-sloping passage when the lubricating rotor is rotating. In any of these embodiments, the vent can be located in the vertically downward or downward-sloping passage.

In any of the above embodiments, the bearing housing can include a housing body and a rear cover; at least one of the lubricating liquid passages can be formed in the rear cover, such that the lubricating liquid flows between the rear cover and the housing body when the lubricating rotor is rotating; and leakage of air between the rear cover and the housing body, and thereby into the lubricating liquid passages, can be prevented by a first seal formed between the rear cover and the housing body axially distal to the lubricating liquid passages within the rear cover, in combination with a second seal formed between the rear cover and the housing body axially proximal to the lubricating liquid passages within the rear cover.

In any of the above embodiments, when the lubricating rotor is not rotating, air can be substantially unable to enter the lubricating liquid passages, thereby preventing the lubricating liquid from flowing gravitationally to the sump when the lubricating rotor is not rotating.

In any of the above embodiments, the support bearing can be a journal bearing.

Any of the above embodiments can further include a thrust bearing configure to limit axial movements of the rotating shaft. In some of these embodiments, the thrust bearing is lubricated by the lubrication system. Any of these embodiments can further include an axial displacement measurement probe cooperative with the thrust bearing and located proximate the lubricating rotor.

In any of the above embodiments, the vertically upward or upwardly sloping segment of the lubrication delivery passage can be a segment of a lubrication collar that surrounds the support bearing, the lubrication collar being in liquid communication with the support bearing via lubrication inlets located above the charge-retaining section of the lubricating liquid passages.

And in any of the above embodiments, during a rotation startup of the shaft, the charge of the lubricating liquid can be adequate to provide lubrication of the bearings at least during the first ten rotations of the shaft.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a bearing assembly that is configured to support the shaft of a rotating shaft apparatus. The bearing assembly comprises at least one bearing that is lubricated by an internal, pressurized lubrication system comprising a lubricating liquid or "oil" that is pumped to the bearings from an "oil sump" by a lubricating rotor that is directly or indirectly driven by the shaft. The disclosed lubrication system minimizes or eliminates lubrication delays during system startup, without requiring direct contact between the lubricating rotor and the lubricating liquid in the oil sump. In embodiments, the lubricating liquid is an oil. However, it will be understood that the terms "oil" and "oil sump" are used herein generically to refer to any liquid lubricant and associated sump, unless otherwise stated or required by context.

Figure 1:
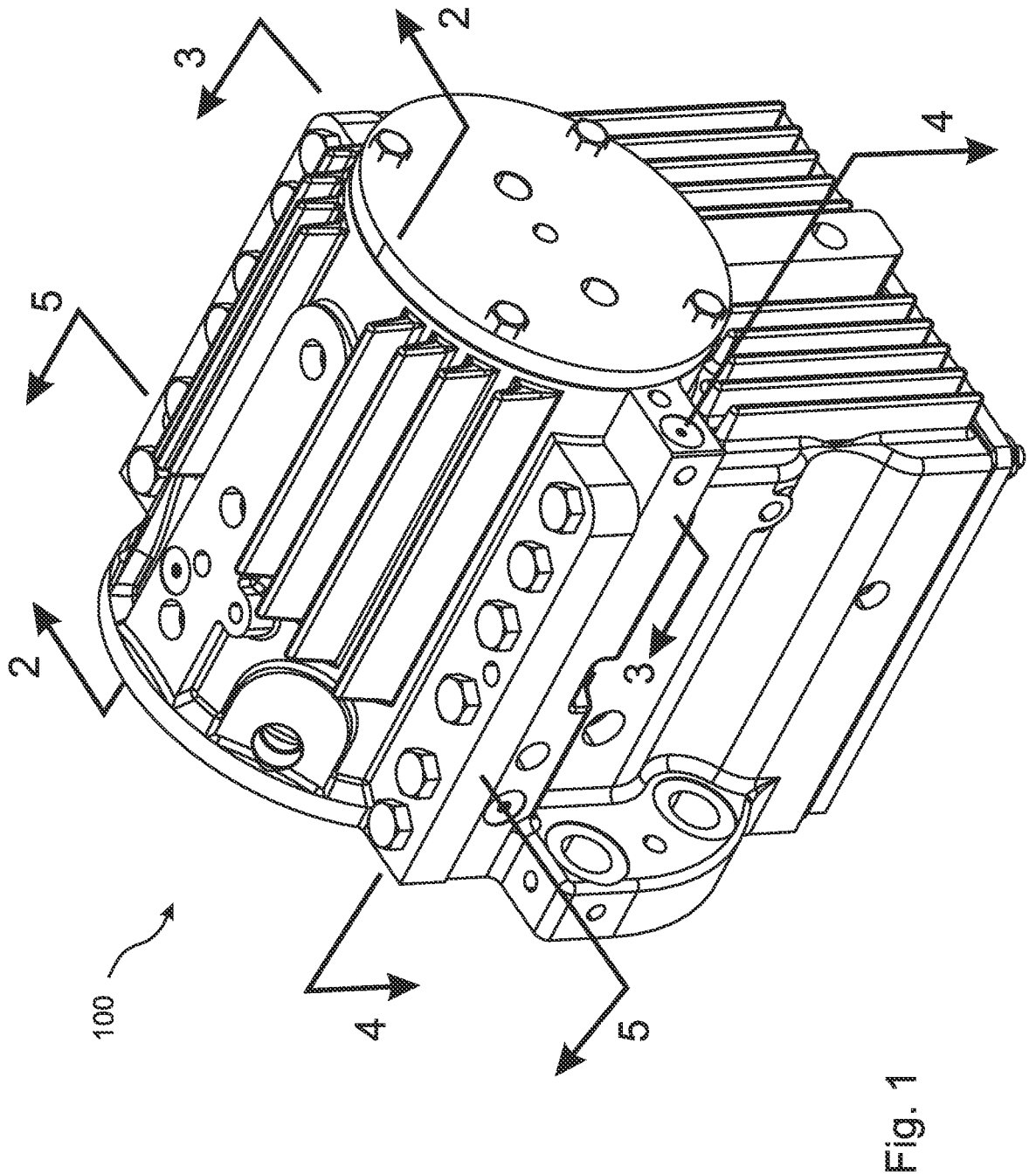
FIG. 1 is a perspective view, drawn to scale, of an exemplary embodiment of the present invention.

A perspective view of an exemplary embodiment 100 of the present invention is presented in FIG. 1. FIGS. 2-5B are sectional views of this exemplary embodiment having section planes as indicated in FIG. 1.

Figure 2:
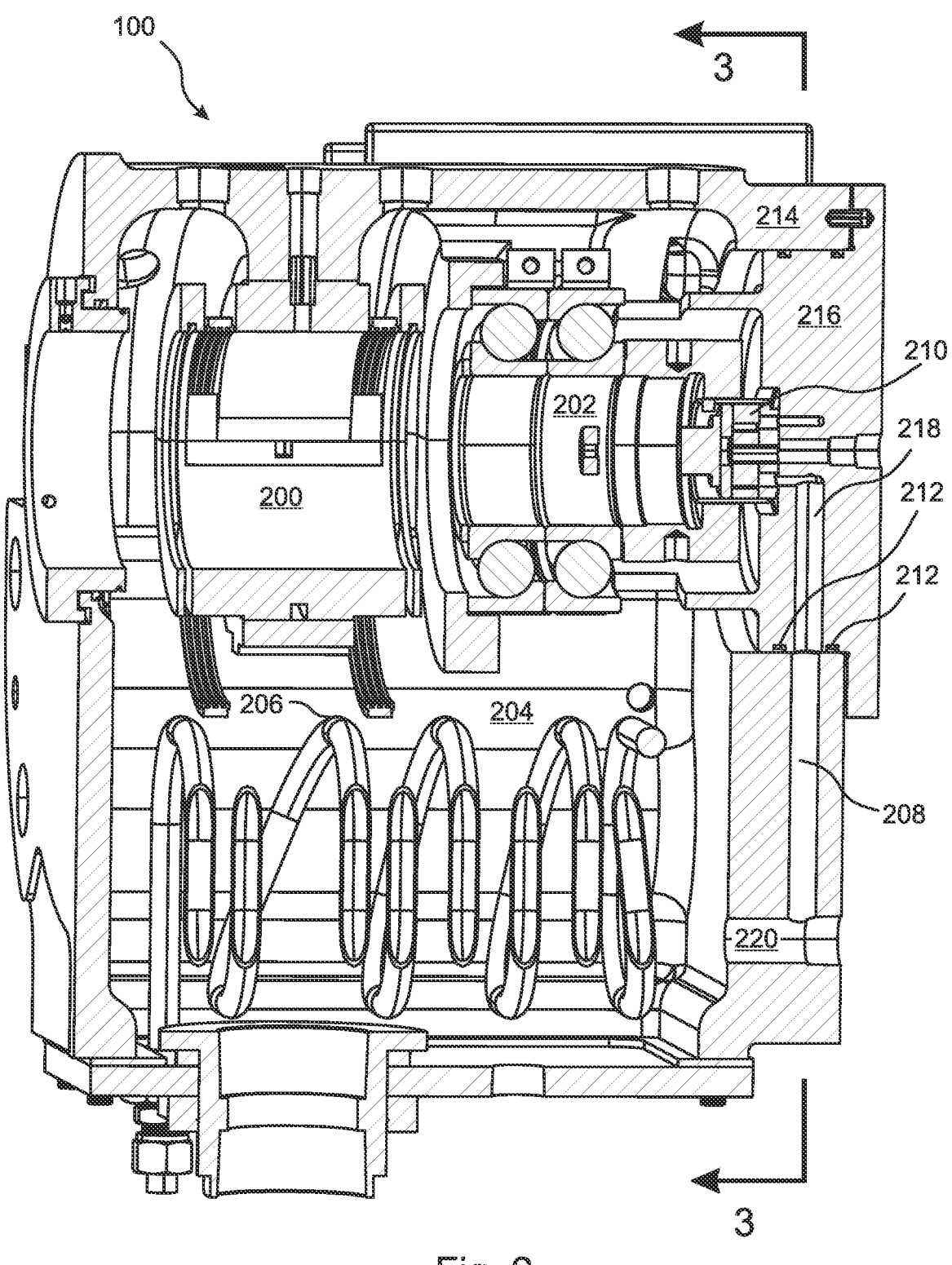
FIG. 2 is a longitudinal sectional view, drawn to scale, of the exemplary embodiment.

With reference to FIG. 2, the exemplary embodiment comprises a journal bearing 200 that radially supports a rotating shaft (not shown), as well as a thrust bearing 202 that limits axial movements of the shaft. The bearing housing 100 of the exemplary embodiment comprises a lubrication system that includes an oil sump 204 and a system of oil passages, including a "suction side" passage 208 having a suction inlet 220 through which oil is drawn from the sump 204 by the lubricating rotor 210.

A set of cooling coils 206 is provided in the sump 204 through which an oil cooling fluid is circulated. A rear "cover" or plug 216 comprises a suction side extension 218 through which the oil is transferred from the suction side passage 208 to the lubricating rotor 210. The rear cover 216 is sealed to the body 214 of the bearing housing by a pair of O-ring seals 212 that surround the rear cover 216. In combination, these O-ring seals 212 prevent air from leaking from either side of the rear cover 216 into any of the oil passages that extend from the body 214 into the rear cover 216. In similar embodiments, air is prevented from leaking into any of the oil passages by individual O-rings associated with each of the oil passage junctures, or by other sealing mechanisms as are known in the art.

When the shaft is not rotating, the oil passages maintain a quantity of oil, referred to herein as an "oil charge," in a "charge-retaining section" (600 in FIG. 6) that is close to the bearings, even if there is a loss of prime on the suction side 208, 218 of the lubricating rotor 210, for example if rotation of the shaft remains halted during an extended period of time.

When rotation of the shaft is restarted, the retained oil charge is immediately delivered to the bearings 200, even while the lubricating rotor 210 is initially pumping an "air pocket" toward the bearings 200 as it draws oil from the sump 204 and refills the remainder of the oil passages 208, 218 with oil. The retained oil charge is adequate to provide initial lubrication of the bearings 200 during startup, in embodiments during the first 10 to 15 shaft rotations, which is sufficient to sustain lubrication of the bearings 200 as the air pocket reaches the bearings and passes through, for example during one to five shaft rotations, until the normal delivery of oil from the sump 204 to the bearings 200 has resumed. Accordingly, lubrication startup delay is virtually eliminated by the present invention.

Figure 3:
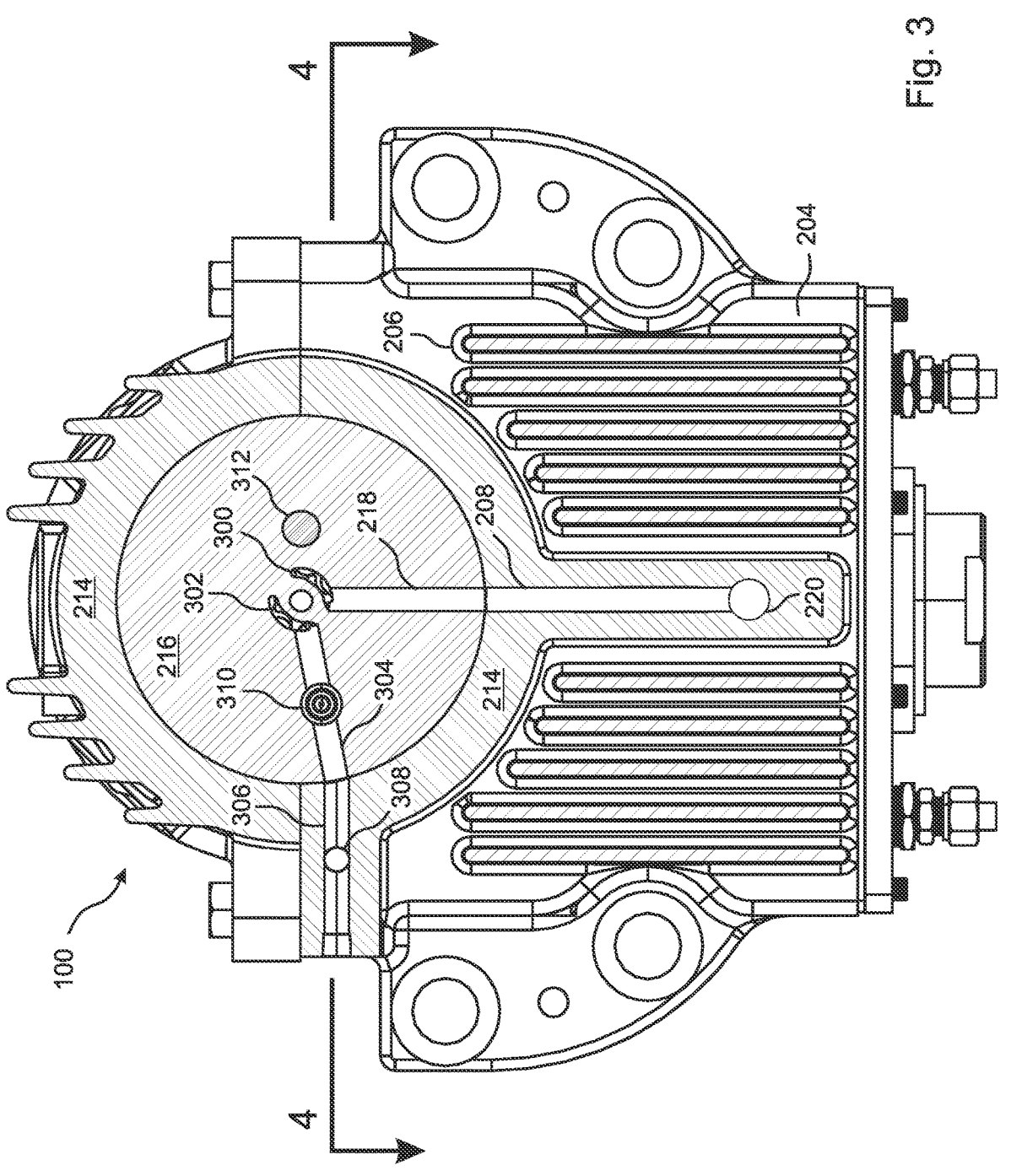
FIG. 3 is a lateral sectional view, drawn to scale, of the exemplary embodiment that intersects the rear plate of the bearing assembly.
Figure 6:
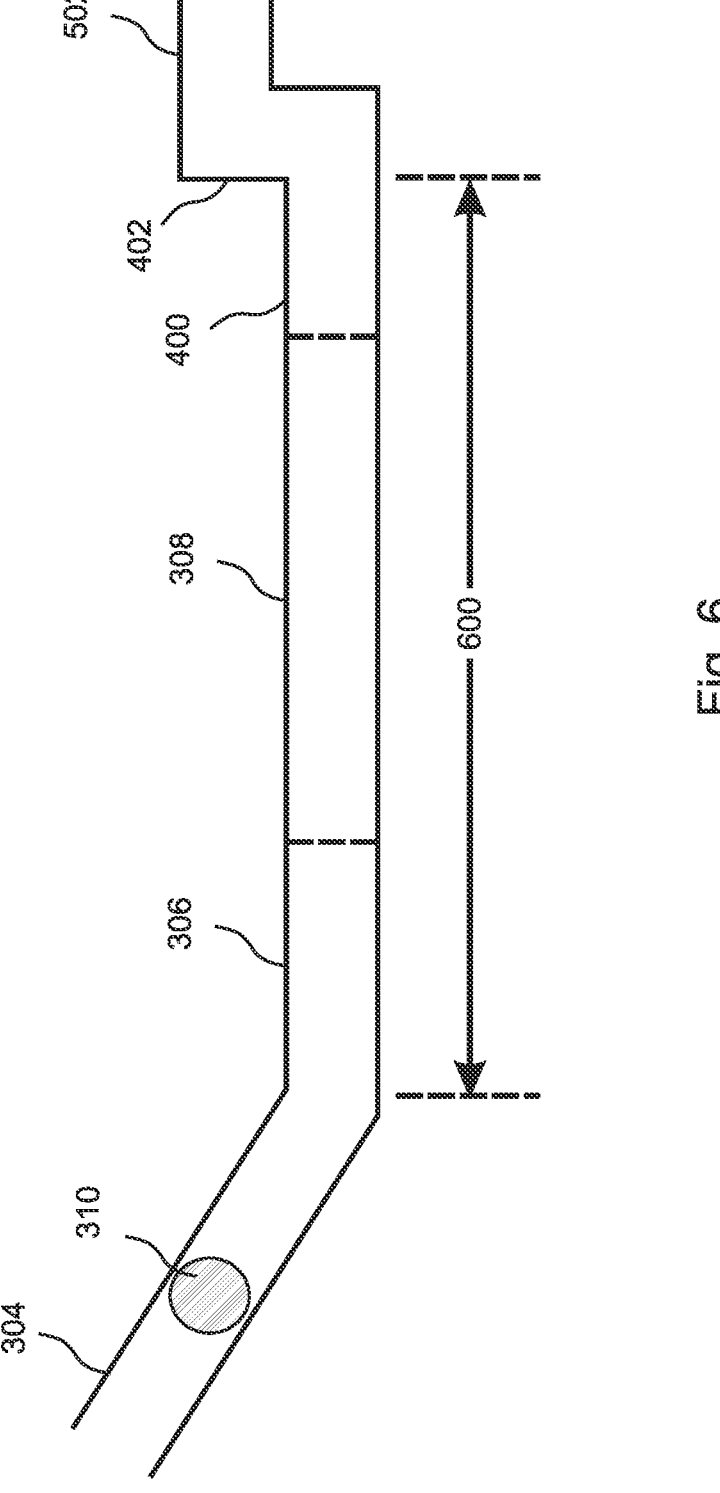
FIG. 6 is a simplified illustration of the oil passages that direct oil from the lubricating rotor to the lubrication port.

With reference to FIG. 3 and FIG. 6, in the exemplary embodiment, oil from the suction side extension 218 is directed through a rotor inlet 300 to the lubricating rotor 210, and pressurized oil is returned to a rotor outlet 302, from which it flows through a downward sloping passage 304 to a first segment 306 of the charge retaining section

600, and then into a second, horizontal segment 308 of the charge retaining section 600. Note that passage 304 is sloped "downward" relative to the lubricating rotor 210, but "upward" relative to the charge retaining section 600. A flow restrictor 310 that acts as a vent during a system shutdown is provided between the lubricating rotor 210 and the charge-retaining section 600. In the exemplary embodiment, an axial displacement measurement probe 312 is located in parallel with the shaft driven lubricating rotor 210. In similar embodiments, the axial displacement measurement probe 312 is provided at other locations relative to the lubricating rotor 210.

Figure 4:
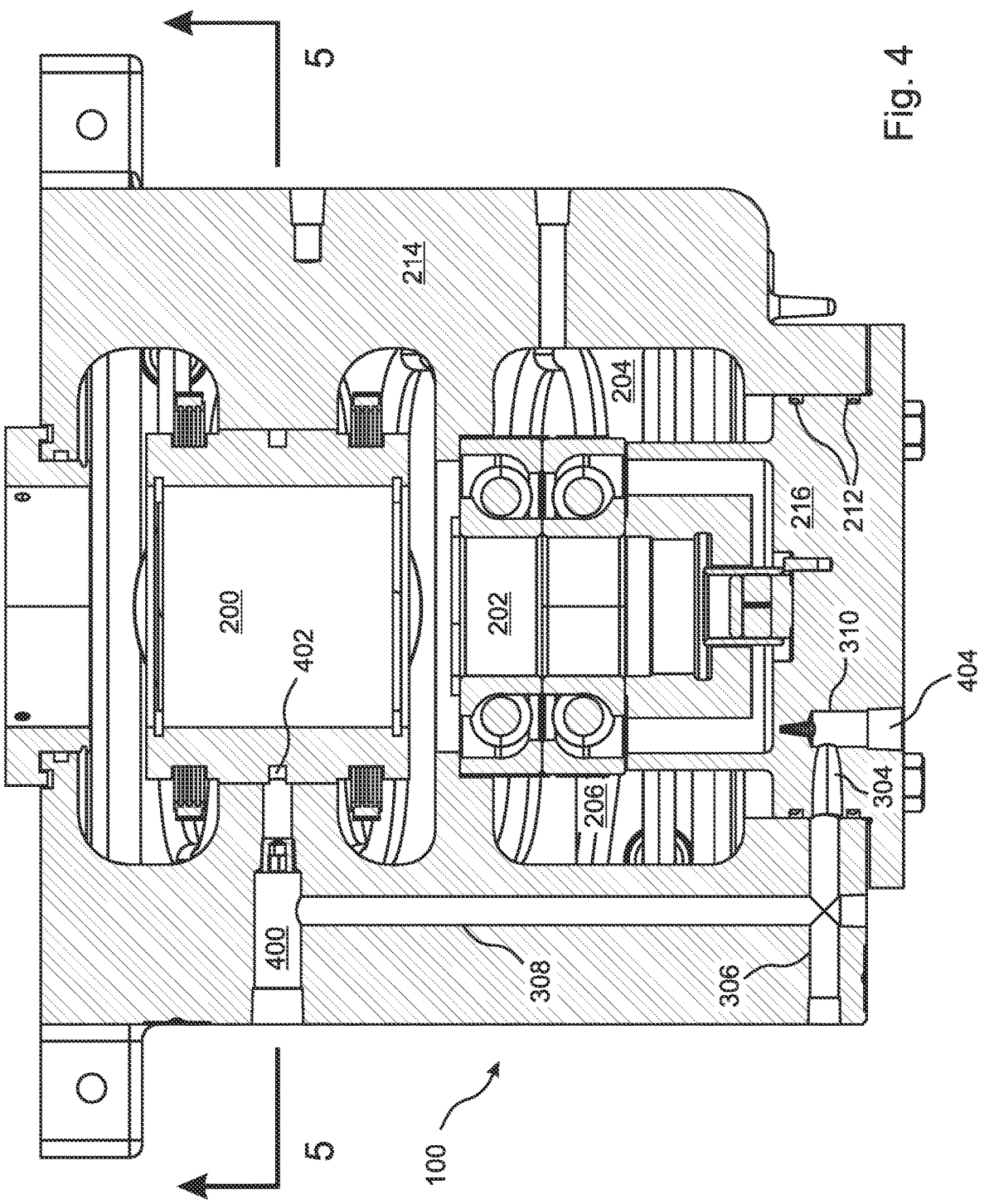
FIG. 4 is a horizontal sectional view, drawn to scale, of the exemplary embodiment.

With reference to FIG. 4 and FIG. 6, the second segment 308 of the charge-retaining section 600 continues within the bearing housing 100 parallel to the shaft to a bearing lubrication inlet port 400, which extends laterally inward to a lubrication collar 402. In the exemplary embodiment, the bearing housing 100 is configured to enable delivery of pressurized oil to additional bearing housings via an oil circulation port 404 that is cooperative with the flow restrictor 310. In some of these embodiments, charge-retaining sections are included in the oil passages of each of the bearing housings that are configured to retain oil charges during a shutdown.

Figure 5A:
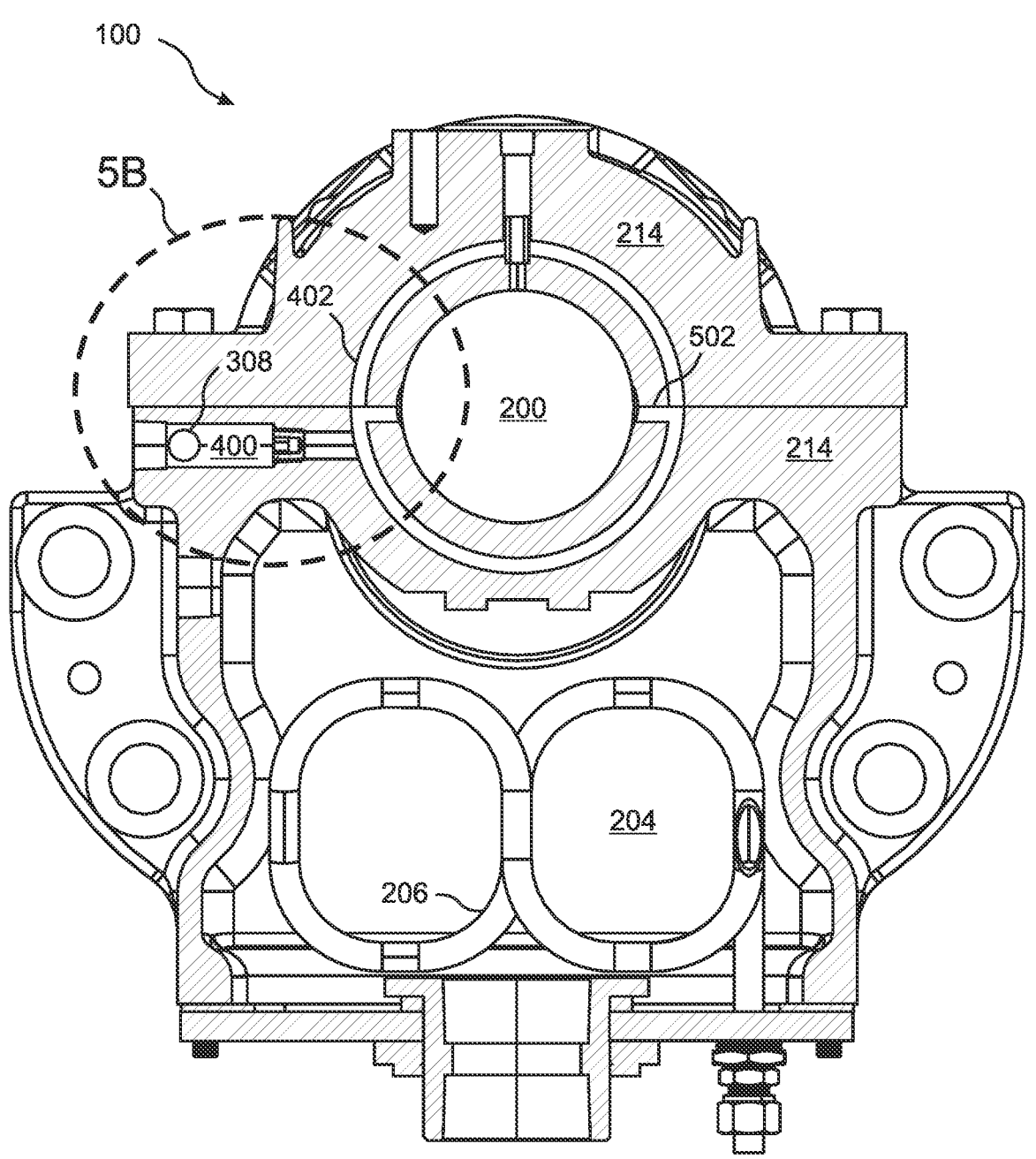
FIG. 5A is a lateral sectional view, drawn to scale, of the exemplary embodiment that intersects the lubrication inlet port of the bearing assembly.
Figure 5B:
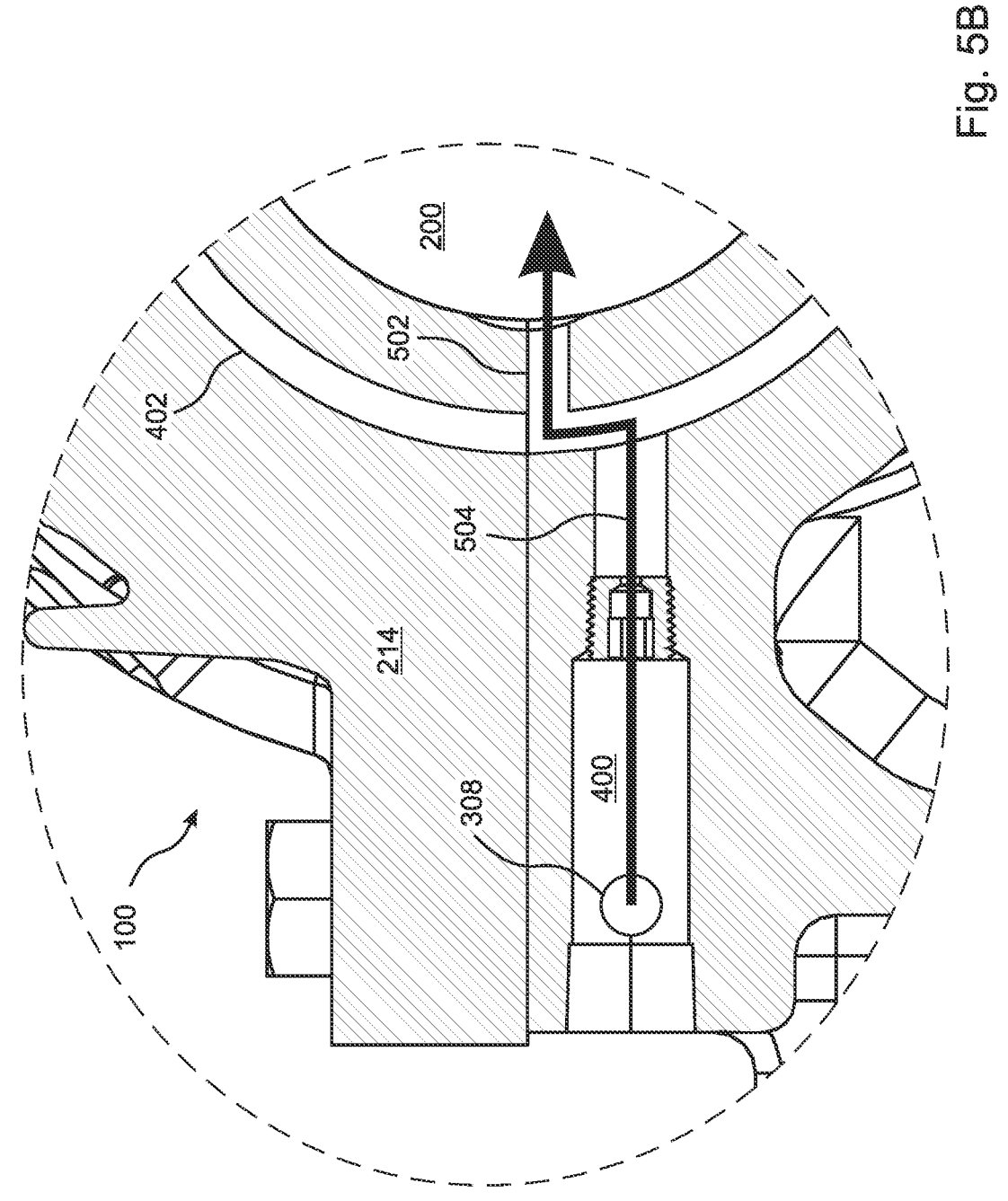
FIG. 5B is a closeup view, drawn to scale, of a portion of the sectional view of FIG. 5A.

With reference to FIGS. 5A, 5B, and 6, the oil flows from the lubrication inlet port 400 into the lubrication collar 402, and then through lubrication inlets 502 to the axial support bearing 200, which in the exemplary embodiment is a journal bearing 200. The flow path 504 of the oil is indicated in the enlargement of FIG. 5B. It can be seen in the figure that the oil is required to flow almost vertically in the lubrication collar 402 before it can enter the lubrication inlet 502 and flow to the bearing 200. The lubrication collar 402 thereby terminates the charge-retaining section 600 of the oil passages.

FIG. 6 is a simplified illustration of the path that is followed by lubricating oil in the exemplary embodiment from the lubricating rotor 210 to the bearings 200. For simplicity of illustration, the passage segments are indicated as if they were co-planar. It can be seen in the illustration that the charge-retaining section 600 includes passages 306, 308, and 400, and is bounded by the upward sloping passage 304 (relative to the charge-retaining section 600) and the nearly vertical passage 402.

The oil passages are tightly sealed, including by the seals 212 between the rear cover 216 and the body 214 of the bearing housing 100, such that air is only able to enter the oil passages during a system shutdown via the flow restrictor 310, and possibly also via the bearings 200. In embodiments, the flow restrictor 310 is configured such that the rate at which air can enter the oil passages during a shutdown via the flow restrictor 310 is slightly faster than the rate at which air is able to enter the oil passages via the bearings 200, thereby preventing the retained oil charge from being syphoned away as the oil from the remainder of the oil passages drains into the sump 204.

In the exemplary embodiment, the bearings 200 are journal bearings 100, which substantially prevent air from entering the oil passages via the bearings 200 during a shutdown. Accordingly, the flow restrictor 310 in the exemplary embodiment is configured to allow only a very slow entry of air, such that little if any oil drains from the oil passages into the sump 204 during a shutdown, all of the oil passages remain filled with oil, and the pumping system retains its prime, unless the shutdown continues for an extended period of time.

And even if the prime is lost during a shutdown of the exemplary embodiment, the retained oil charge is inhibited from draining into the sump 204 because the charge-retaining section 600 is bounded on both sides by segments of the oil passages that are either vertical 402, or slanted obliquely upward 304, and because the flow restrictor 310 prevents the oil in the charge-retaining section 600 from being syphoned away.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A bearing assembly comprising:
a bearing housing;
a support bearing installed in the bearing housing and configured to radially support a horizontal, rotatable shaft; and
a lubrication system comprising:
a sump formed in a lower section of the bearing housing, the sump being configured to contain a lubricating liquid;
a plurality of lubricating liquid passages formed in the bearing housing; and
a lubricating rotor installed in the bearing housing above the sump and configured to be rotated by the shaft, the lubricating rotor, in combination with the lubricating liquid passages, being configured to draw the lubricating liquid from the sump, pressurize the lubricating liquid, and direct the pressurized lubricating liquid to the support bearing;
wherein the lubricating liquid passages comprise:
a suction passage configured to direct the lubricating liquid at ambient pressure from the sump to the lubricating rotor;
a vertically downward or downward-sloping passage having a substantially uniform cross-sectional area, the vertically downward or downward-sloping passage being configured to receive the pressurized lubricating liquid from the lubricating rotor; and
a charge-retaining section extending substantially horizontally from the vertically downward or downward-sloping passage to a lubrication delivery passage proximate the support bearing, the lubrication delivery passage providing liquid access from the charge-retaining section to the support bearing via a vertically upward or upwardly sloping segment, the vertically upward or upwardly sloping segment being substantially uniform in cross-sectional area and the charge-retaining section being thereby configured to retain a charge of the lubricating liquid when the lubricating rotor is not rotating.

2. The bearing assembly of claim 1, further comprising a vent configured to control a flow of air into the suction passage when the lubricating rotor is not rotating, thereby preventing the charge of the lubricating liquid from being syphoned out of the charge-retaining section as the lubricating liquid is gravitationally drawn from the suction passage to the sump.

3. The bearing assembly of claim 2, wherein the vent also functions as a flow restrictor that is configured to control a flow of the pressurized lubricating liquid through the vertically downward or downward-sloping passage when the lubricating rotor is rotating.

4. The bearing assembly of claim 2, wherein the vent is located in the vertically downward or downward-sloping passage.

5. The bearing assembly of claim 1, wherein:
the bearing housing comprises a housing body and a rear cover;
at least one of the lubricating liquid passages is formed in the rear cover, such that the lubricating liquid flows between the rear cover and the housing body when the lubricating rotor is rotating; and
leakage of air between the rear cover and the housing body, and thereby into the lubricating liquid passages, is prevented by a first seal formed between the rear cover and the housing body axially distal to the lubricating liquid passages within the rear cover, in combination with a second seal formed between the rear cover and the housing body axially proximal to the lubricating liquid passages within the rear cover.

6. The bearing assembly of claim 1, wherein when the lubricating rotor is not rotating, air is substantially unable to enter the lubricating liquid passages, thereby preventing the lubricating liquid from flowing gravitationally to the sump when the lubricating rotor is not rotating.

7. The bearing assembly of claim 1, wherein the support bearing is a journal bearing.

8. The bearing assembly of claim 1, further comprising a thrust bearing configured to limit axial movements of the rotating shaft.

9. The bearing assembly of claim 8, further comprising an axial displacement measurement probe cooperative with the thrust bearing and located proximate the lubricating rotor.

10. The bearing assembly of claim 1, wherein the vertically upward or upwardly sloping segment of the lubrication delivery passage is a segment of a lubrication collar that surrounds the support bearing, the lubrication collar being in liquid communication with the support bearing via lubrication inlets located above the charge-retaining section of the lubricating liquid passages.

11. The bearing assembly of claim 1, wherein, during a rotation startup of the shaft, the charge of the lubricating liquid lubricates the bearings at least during ten initial rotations of the shaft.

* * * * *